United States Patent
Lee et al.

(10) Patent No.: US 9,558,539 B2
(45) Date of Patent: Jan. 31, 2017

(54) METHOD OF PROCESSING IMAGE DATA AND DISPLAY SYSTEM FOR DISPLAY POWER REDUCTION

(71) Applicant: SAMSUNG DISPLAY CO., LTD., Yongin, Gyeonggi-Do (KR)

(72) Inventors: Myung-Woo Lee, Cheonan-si (KR); Tae-Whan Kim, Seoul (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/666,943

(22) Filed: Mar. 24, 2015

(65) Prior Publication Data

US 2016/0093031 A1 Mar. 31, 2016

(30) Foreign Application Priority Data

Sep. 30, 2014 (KR) ........................ 10-2014-0132059

(51) Int. Cl.
*G09G 5/02* (2006.01)
*G09G 5/20* (2006.01)
*G09G 3/12* (2006.01)
*G06T 11/00* (2006.01)
*G06T 3/40* (2006.01)
*G06T 5/40* (2006.01)
(Continued)

(52) U.S. Cl.
CPC .............. *G06T 5/20* (2013.01); *G06F 1/3203* (2013.01); *G09G 3/12* (2013.01); *G09G 3/3208* (2013.01); *G06T 2207/10004* (2013.01); *G09G 2320/0271* (2013.01); *G09G 2320/0666* (2013.01); *G09G 2330/021* (2013.01); *G09G 2360/16* (2013.01)

(58) Field of Classification Search
CPC combination set(s) only.
See application file for complete search history.

(56) References Cited

U.S. PATENT DOCUMENTS 7,221,805 B1 * 5/2007 Bachelder .............. G03B 13/36
348/208.12
2002/0031203 A1 * 3/2002 Polichar .................. A61B 6/00
378/98.2
(Continued)

FOREIGN PATENT DOCUMENTS

KR 10-2002-0057778 A 7/2002
KR 10-2003-0047800 A 6/2003
(Continued)

OTHER PUBLICATIONS

Lee, et al., "Power-constrained contrast enhancement for emissive displays based on histogram equalization," IEEE Transactions on Image Processing 21(1), 80-93 (Jan. 2012).
(Continued)

*Primary Examiner* — Wesner Sajous
(74) *Attorney, Agent, or Firm* — Lee & Morse P.C.

(57) ABSTRACT

To process image data, a distribution of gray levels of frame image data is detected. A remapping function for providing remapped gray levels is determined based on the distribution of the gray levels such that a number of the remapped gray levels is less than a number of the gray levels. Low-power frame image data are provided based on the frame image data and the remapping function such that displaying the low-power frame image data uses less power than the frame image data.

20 Claims, 10 Drawing Sheets (51) Int. Cl.
*G06F 1/32* (2006.01)
*G06F 17/10* (2006.01)
*H04N 1/60* (2006.01)
*H04N 5/57* (2006.01)
*G06T 5/20* (2006.01)
*G09G 3/32* (2016.01)

(56) References Cited

U.S. PATENT DOCUMENTS

2008/0101697 A1* 5/2008 Cho .................. G06T 5/009
382/169
2013/0342585 A1* 12/2013 Chun ................ G09G 3/3208
345/690

FOREIGN PATENT DOCUMENTS

| KR | 10-2008-0044457 A | 5/2008 |
| KR | 10-2009-0048876 A | 5/2009 |
| KR | 10-2010-0062129 A | 6/2010 |
| KR | 10-2011-0035956 A | 4/2011 |
| KR | 10-2011-0040248 A | 4/2011 |
| KR | 10-2011-0107025 A | 9/2011 |
| KR | 10-2012-0024829 A | 3/2012 |
| KR | 10-2012-0072476 A | 7/2012 |

OTHER PUBLICATIONS

Dong, et al. "Chameleon: A color-adaptive web browser for mobile oled displays," IEEE Transactions on Mobile Computing 11(5), 724-738 (May 2012).

Shin, et al. "Dynamic driver supply voltage scaling for organic light emitting diode displays," IEEE Transaction on Computer-aided Design, 32(7), 1017-1030 (Jul. 2013).

* cited by examiner

| GRAY LEVEL → | 0 | 1 | 2 | ... | 72 | 73 | ... | L-1 |
|---|---|---|---|---|---|---|---|---|
| TCS → | - | - | - | ... | 6 | - | ... | - |
| CL → | - | - | - | ... | 3 | - | ... | - |
| LP → | - | - | - | ... | 15 | - | ... | - |

FIG. 6B

| GRAY LEVEL → | 0 | 1 | 2 | ... | 72 | 73 | ... | L-1 |
|---|---|---|---|---|---|---|---|---|
| TCS → | - | - | - | ... | 0 | - | ... | - |
| CL → | - | - | - | ... | 9 | - | ... | - |
| LP → | - | - | - | ... | 18 | - | ... | - |

| IMAGE # | RT (msec) | n(R) | PR | BR | | CR | |
|---|---|---|---|---|---|---|---|
| | | | | FID | LPFID | FID | LPFID |
| 1 | 0.067 | 37 | 0.89 | 110.23 | 103.40 | 0.13 | 0.14 |
| 2 | 0.069 | 42 | 0.81 | 84.15 | 76.01 | 0.06 | 0.07 |
| 3 | 0.067 | 49 | 0.94 | 103.53 | 100.21 | 0.09 | 0.10 |
| 4 | 0.069 | 36 | 0.93 | 86.95 | 83.27 | 0.18 | 0.19 |
| 5 | 0.066 | 40 | 0.91 | 131.08 | 123.81 | 0.09 | 0.10 |
| 6 | 0.067 | 45 | 0.88 | 110.35 | 103.19 | 0.11 | 0.12 |
| 7 | 0.066 | 36 | 0.90 | 121.26 | 113.44 | 0.17 | 0.18 |
| 8 | 0.068 | 36 | 0.88 | 95.88 | 88.93 | 0.13 | 0.16 |
| 9 | 0.069 | 48 | 0.96 | 155.17 | 151.41 | 0.08 | 0.09 |
| 10 | 0.091 | 37 | 0.87 | 108.59 | 100.11 | 0.13 | 0.14 |
| 11 | 0.067 | 36 | 0.96 | 97.41 | 95.42 | 0.13 | 0.13 |
| 12 | 0.064 | 36 | 0.93 | 109.34 | 102.63 | 0.17 | 0.19 |
| 13 | 0.065 | 50 | 0.87 | 105.49 | 97.65 | 0.07 | 0.08 |
| 14 | 0.069 | 36 | 0.97 | 166.37 | 163.12 | 0.11 | 0.11 |
| 15 | 0.068 | 38 | 0.85 | 115.37 | 106.39 | 0.10 | 0.11 |
| 16 | 0.066 | 40 | 0.85 | 112.62 | 103.64 | 0.08 | 0.09 |
| 17 | 0.066 | 49 | 0.88 | 109.91 | 102.96 | 0.08 | 0.08 |
| 18 | 0.067 | 51 | 0.93 | 109.59 | 104.78 | 0.13 | 0.14 |
| 19 | 0.064 | 44 | 0.98 | 129.25 | 128.25 | 0.08 | 0.08 |
| 20 | 0.099 | 40 | 0.86 | 99.95 | 91.91 | 0.09 | 0.10 |
| 21 | 0.065 | 45 | 0.88 | 120.17 | 112.75 | 0.08 | 0.08 |
| 22 | 0.065 | 38 | 0.89 | 115.29 | 108.29 | 0.09 | 0.10 |
| 23 | 0.063 | 36 | 0.96 | 82.83 | 80.83 | 0.15 | 0.15 |
| 24 | 0.068 | 37 | 0.81 | 77.76 | 68.78 | 0.14 | 0.16 |
| AVERAGE | 0.069 | 41(16%) | 0.90 | 110.77 | 104.63 | 0.11 | 0.12 |

FIG. 11

METHOD OF PROCESSING IMAGE DATA AND DISPLAY SYSTEM FOR DISPLAY POWER REDUCTION

CROSS REFERENCE TO RELATED APPLICATION

Korean Patent Application No. 10-2014-0132059, filed on Sep. 30, 2014, in the Korean Intellectual Property Office, and entitled: "Method of Processing Image Data and Display System for Display Power Reduction," is incorporated by reference herein in its entirety.

BACKGROUND

1. Field

Example embodiments relate to a data processing and, more particularly, to a method of processing image data and a display system for display power reduction.

2. Description of the Related Art

Recently, various display devices such as liquid crystal displays (LCD), plasma displays, and electroluminescent displays have gained popularity. Particularly, the electroluminescent display can be driven with quick response speed and reduced power consumption, using a light-emitting diode (LED) or an organic light-emitting diode (OLED) that emits light through recombination of electrons and holes.

The electroluminescent display can be driven with an analog or a digital driving method. While the analog driving method produces grayscale using variable voltage levels corresponding to input data, the digital driving method produces grayscale using variable time duration in which the LED emits light. The analog driving method is difficult to implement because it requires a driving integrated circuit (IC) that is complicated to manufacture if the display is large and has high resolution. The digital driving method, on the other hand, can readily accomplish the required high resolution through a simpler IC structure.

A special attention is being paid to the electroluminescent display device for replacing the LCD due to the merits of the quick response speed, the excellent reproducibility of colors, etc. Also the electroluminescent display device has the merits of emitting lights by unit of pixels without backlight that is essential for the LCD. However, the electroluminescent display device requires to overcome several important issues such as uniformity in pixels, degradation of brightness, power consumption, etc. In particular, as the display resolution as well as the panel size increases rapidly, reducing power consumption in the electroluminescent display device becomes utmost concern in designing electronic devices such as mobile devices, televisions, etc.

SUMMARY

According to example embodiments, a method of processing image data includes detecting a distribution of gray levels of frame image data, determining a remapping function for providing remapped gray levels based on the distribution of the gray levels such that a number of the remapped gray levels is less than a number of the gray levels and providing low-power frame image data based on the frame image data and the remapping function such that displaying the low-power frame image data uses less power than displaying the frame image data.

The distribution of the gray levels may include pixel numbers respectively corresponding to the gray levels and localities respectively representing degrees of nearness of pixels having the same gray levels in a frame.

The remapping function may be determined as following equation, $$G(g)=g-d(g),$$

where g is each gray level, G( ) is the remapping function, G(g) is the remapped gray level corresponding to the gray level of g and d( ) is a decrement function that depends on the distribution of the gray levels.

A value of the decrement function may decrease as the pixel number corresponding to the gray level decreases.

A value of the decrement function may decrease as the pixels having the same gray level locate nearer to each other in a frame.

Detecting the distribution of the gray levels may include detecting pixel numbers respectively corresponding to the gray levels.

The decrement function may be determined as follows, $$d(g)=d(g-1)*[1-H(g)/N], \text{ if } g \in (U-Rs),$$

$$d(g)=d(g-1)+1, \text{ if } g \in Rs,$$

$$d(0)=0 \text{ and } d(1)=1,$$

where $H(g)$ is the pixel number corresponding to the gray level of g, N is a total number of the pixels in a frame, U is a universal set including all of the gray levels, R is a first set including the gray levels satisfying $H(g)=0$, and Rs is a second set that is a subset of the first set.

The second set may be determined by extracting the gray levels in the first set by a reference number sequentially from the smallest gray level in the first set.

The reference number may be determined as a maximum integer of M that satisfies following equation, $$L-M \geq L*D,$$

where L is a total number of the gray levels and D is a scaling parameter representing a degree of display power reduction.

Detecting the distribution of the gray levels may include detecting pixel numbers respectively corresponding to the gray levels and detecting localities respectively representing degrees of nearness of pixels having the same gray levels in a frame.

The decrement function may be determined as follows, $$d(g)=d(g-1)*[1-CL(g)/H(g)]*[1-H(g)/N], \text{ if } g \in (U-R),$$

$$d(g)=d(g-1), \text{ if } g \in (R-Rs),$$

$$d(g)=d(g-1)+1, \text{ if } g \in Rs,$$

$$d(0)=0 \text{ and } d(1)=1,$$

where $CL(g)$ is the locality representing the degree of nearness of the pixels having the same gray level of g in the frame, $H(g)$ is the pixel number corresponding to the gray level of g, N is a total number of the pixels in the frame, U is a universal set including all of the gray levels, R is a first set including the gray levels satisfying $H(g)=0$, and Rs is a second set that is a subset of the first set.

Each of clusters corresponding to the gray level of g may be detected when two or more pixels having the same gray level of g are located near to each other in each row in the frame, and the locality of $CL(g)$ corresponding to the gray level of g may be determined based on a total number of the pixels having the same gray level of g and included in all of the clusters.

It may be determined that the two pixels are included in the same cluster when a distance of the two pixels having the same gray level in the same row is equal to or smaller than a reference distance.

The second set may be determined by extracting the gray levels in the first set by a reference number sequentially from the smallest gray level in the first set.

The reference number may be determined as a maximum integer of M that satisfies following equation, $$L-M \geq L*D,$$

where L is a total number of the gray levels and D is a scaling parameter representing a degree of display power reduction.

According to example embodiments, a display system includes a detector to detect a distribution of gray levels of frame image data, a remapper to determine a remapping function for providing remapped gray levels based on the distribution of the gray levels such that a number of the remapped gray levels is less than a number of the gray levels, a filter to provide low-power frame image data based on the frame image data and the remapping function such that displaying the low-power frame image data uses less power than displaying the frame image data, and a display device to display an image based on the low-power frame image data.

The detector may include a histogram detector to provide pixel numbers respectively corresponding to the gray levels and a locality detector to provide localities respectively representing degrees of nearness of pixels having the same gray levels in a frame.

The remapper may determine the remapping function as follows, $$G(g)=g-d(g),$$

where g is each gray level, G( ) is the remapping function, G(g) is the remapped gray level corresponding to the gray level of g, and d( ) is a decrement function that depends on the distribution of the gray levels.

The remapper may determine the decrement function as follows, $$d(g)=d(g-1)*[1-CL(g)/H(g)]*[1-H(g)/N], \text{ if } g \in (U-R),$$

$$d(g)=d(g-1), \text{ if } g \in (R-Rs),$$

$$d(g)=d(g-1)+1, \text{ if } g \in Rs,$$

$$d(0)=0 \text{ and } d(1)=1,$$

where CL(g) is the locality representing the degree of nearness of the pixels having the same gray level of g in the frame, H(g) is the pixel number corresponding to the gray level of g, N is a total number of the pixels in the frame, U is a universal set including all of the gray levels, R is a first set including the gray levels satisfying H(g)=0, and Rs is a second set that is a subset of the first set.

The display device may be an electroluminescent device.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Figure 1:
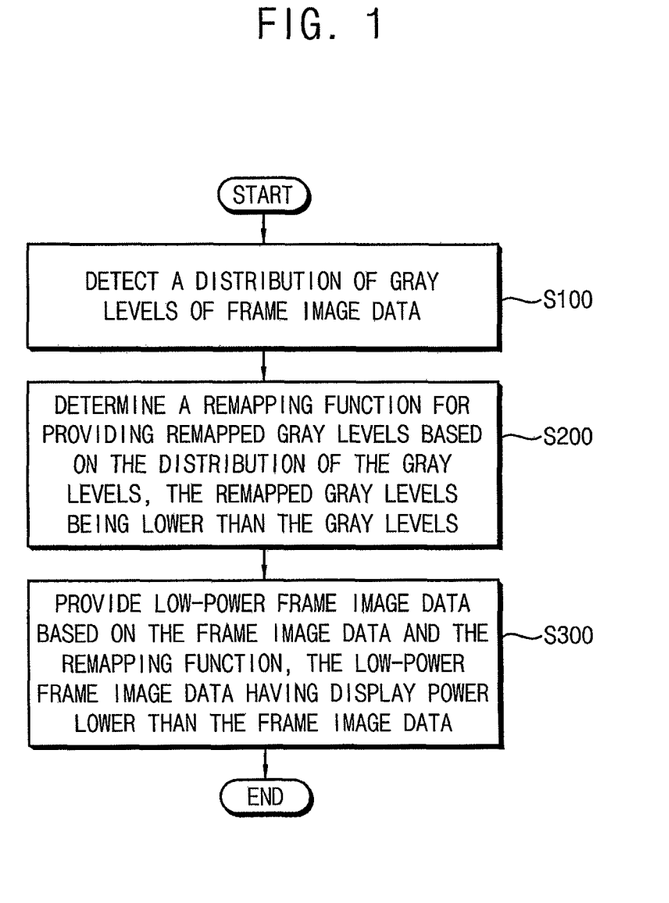
FIG. 1 illustrates a flow chart of a method of processing image data according to example embodiments.
Figure 2:
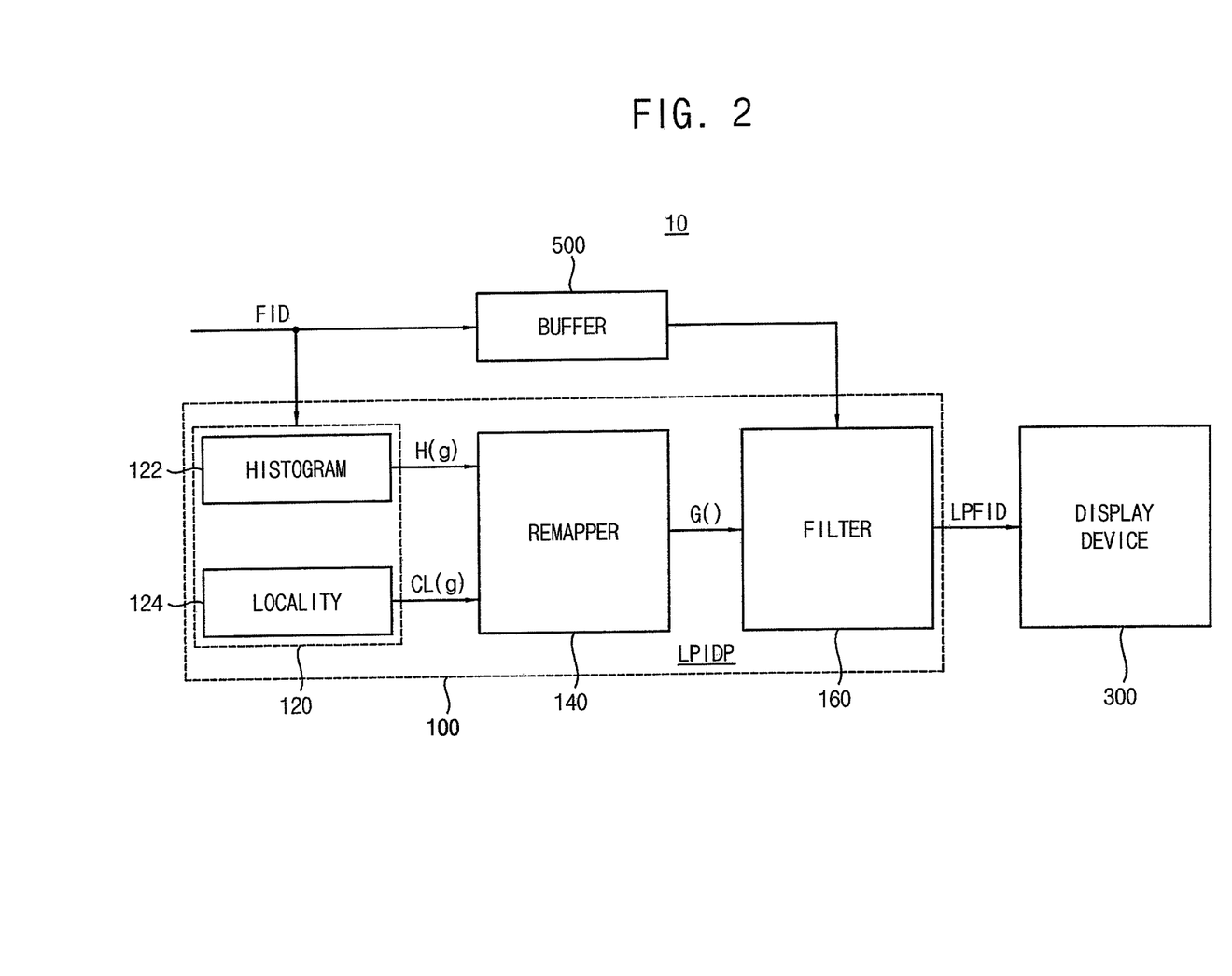
FIG. 2 illustrates a block diagram of a display system according to example embodiments.

FIG. 1 is a flow chart illustrating a method of processing image data according to example embodiments. FIG. 2 is a block diagram illustrating a display system according to example embodiments.

Referring to FIG. 2, a display system 10 includes a low-power image data processor LPIDP 100 and a display device 300. The low-power image data processor 100 includes a detector 120, a remapper 140, and a filter 160 for performing the low-power image data processing. In some example embodiments, the display system 10 may further include a buffer 500 configured to buffer frame image data FID and provide the buffered frame image data to the filter 160.

Even through the low-power image data processor 100 is disposed outside the display device 300 in FIG. 2, at least a portion of the low-power image data processor 100 may be included in a driver integrated circuit in the display device 300. In some example embodiments, at least a portion of the low-power image data processor 100 may be included in an external device such as an application processor.

As appreciated by one skilled in the art, at least a portion of the low-power image data processor 100 may be embodied as a computer program product embodied in one or more computer readable medium(s) having computer readable program code embodied thereon. The computer readable program code may be provided to a processor of a general purpose computer, special purpose computer, or other programmable data processing apparatus.

Referring to FIGS. 1 and 2, the detector 120 detects a distribution of gray levels of frame image data FID (S100). The distribution of the gray levels may include pixel numbers respectively corresponding to the gray levels and localities respectively representing degrees of nearness of pixels having the same gray levels in a frame.

For example, as illustrated in FIG. 2, the detector 120 may include a histogram detection unit 122 and a locality detection unit 124. The histogram detection unit 122 may provide pixel numbers H(g) respectively corresponding to the gray levels g. The locality detection unit 124 may provide localities CL(g) respectively representing degrees of nearness of pixels having the same gray levels g in a frame. The gray level g may be one of 1, 2, 3, . . . , L−1, where L is a total number of the gray levels. For example, when the gray level g is represented by eight bits, the total number L is 256 and the gray level g is one integer between 0 and 255. The distribution of the gray levels and the detection of the distribution are described below with reference to FIGS. 3, 4, 5, 6A and 6B.

The remapper 140 determines a remapping function G( ) for providing remapped gray levels G(g) based on the distribution of the gray levels g, such that the remapped gray levels G(g) are lower than the gray levels g (S200). The remapping function G( ) and the determination of the remapping function G( ) are described below with reference to FIGS. 7, 8, and 9.

The filter 160 provides low-power frame image data LPFID based on the frame image data FID and the remapping function G( ), such that the low-power frame image data LPFID have display power lower than the frame image data FID (S300). The display device 300 displays an image based on the low-power frame image data LPFID.

The remapper 140 may determine the remapping function G( ) by unit of frame, i.e., frame by frame, based on the frame image data FID provided in a form of a bit stream. After the detector 120 and the remapper 140 receive the frame image data FID corresponding to one frame to determine the remapping function G( ) corresponding to the one frame, the filter 160 may begin the conversion of the frame image data FID corresponding to the one frame. The frame image data FID provided as the bit stream may be stored in the buffer 500, and the frame image data FID may be provided from the buffer 500 to the filter 160 after the remapping function G( ) is determined.

As such, display power may be reduced in the display device, e.g., an electroluminescent display device, by processing the image data based on the distribution of the gray levels. The distribution may include the pixel numbers H(g) and the localities CL(g).

FIGS. 3, 4, 5, 6A, and 6B are diagrams for describing processes of detecting distribution of gray levels for a method of processing image data according to example embodiments.

Figure 3:
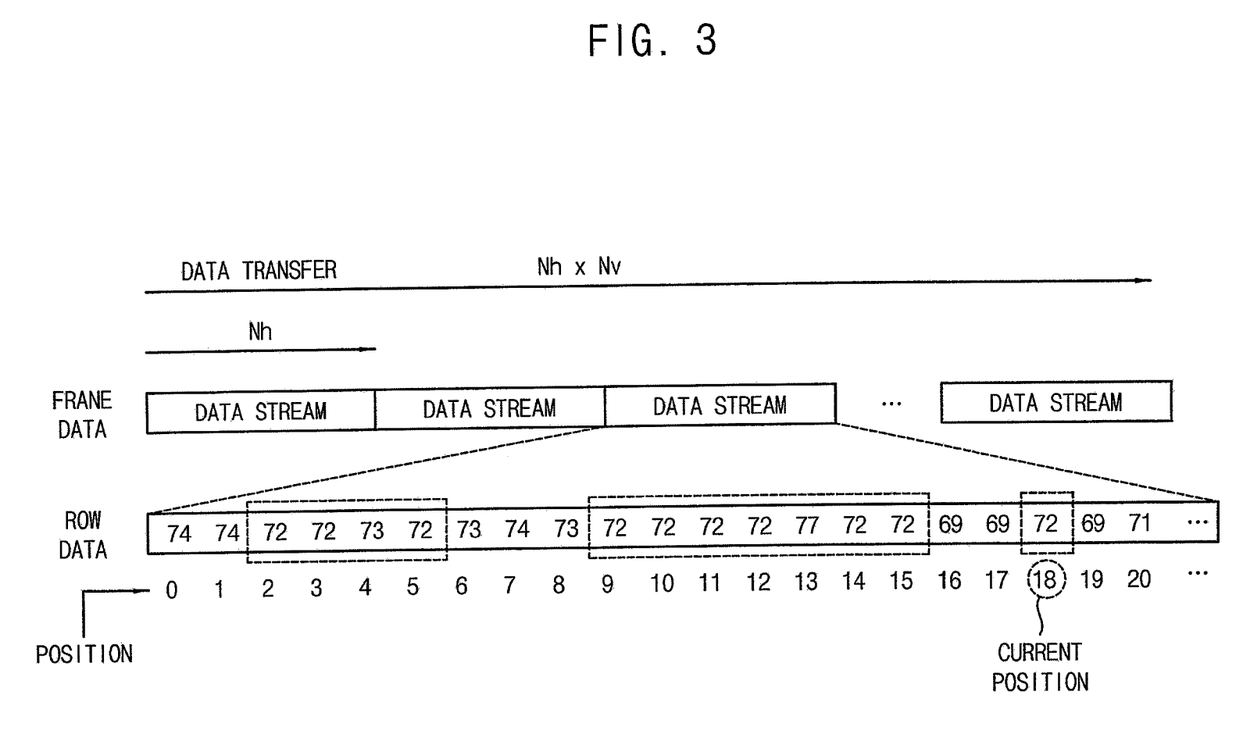
FIGS. 3, 4, 5, 6A, and 6B illustrate diagrams for describing processes of detecting distribution of gray levels for a method of processing image data according to example embodiments.

Referring to FIG. 3, the image data may be provided from an external device, e.g., an application processor (AP), an image signal processor (ISP), etc., as a bit stream. As represented in FIG. 3, one frame data may include Nv row data and one row data may include Nh pixel data. Only the gray levels (e.g., Y) except the color-differences (e.g., Cb, Cr) among the pixel data (e.g., YCbCr) are illustrated in FIG. 3.

The display power Pframe for one frame may be calculated using Equation 1.

$$Pframe = \sum_{i=1}^{N} gi^{\gamma} \qquad \text{Equation 1}$$

In Equation 1, gi is a gray level of the i-th pixel, N is a total number of pixels in a frame, and γ is a compensation value based on visual perception characteristics of a human eye, which is typically set to a value of 2.2.

If the image data are provided as the RGB format, the image data of the RGB format may be converted to the image data of the YCbCr format using a conversion function. For example, a conversion function installed in MAT-LAB® software may be used to convert the image data format. The YCbCr format is represented by a luminance component Y and color-difference components Cb and Cr. There are cases that YCbCr format is more efficient than the RGB format because human eyes are more sensitive to the brightness than to the color. For example, the luminance component Y may represent the gray level g.

The remapping function G( ) may be determined to obtain the remapped gray levels G(g) lower than the gray levels g, and the reduced display power LPframe may be calculated using Equation 2.

$$LPframe = \sum_{g=0}^{L-1} H(g)G(g)^{\gamma} \qquad \text{Equation 2}$$

In Equation 2, H(g) is the pixel number corresponding to the gray level of g, G(g) is the remapped gray levels corresponding to the gray level of g, and L is the total number of the gray levels.

To provide the remapped or reduced gray levels, the remapping function may be determined using Equation 3.

$$G(g)=g-d(g) \qquad \text{Equation 3}$$

In Equation 3, d( ) is a decrement function that depends on the distribution of the gray levels g. The decrement function d( ) may be determined such that the values d(g) are equal to or greater than zero. Thus, the reduced display power LPframe of Equation 2 lower than the display power Pframe of Equation 1 may be achieved.

Figure 4:
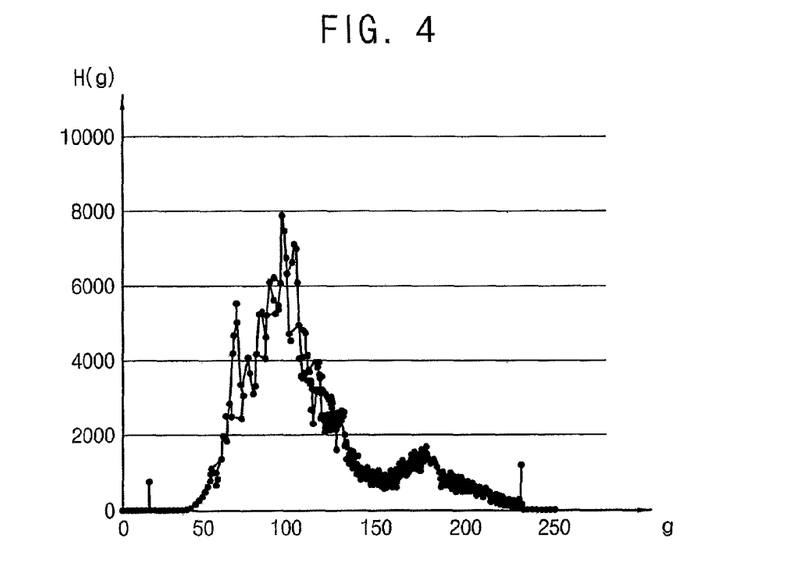
Figure 5:
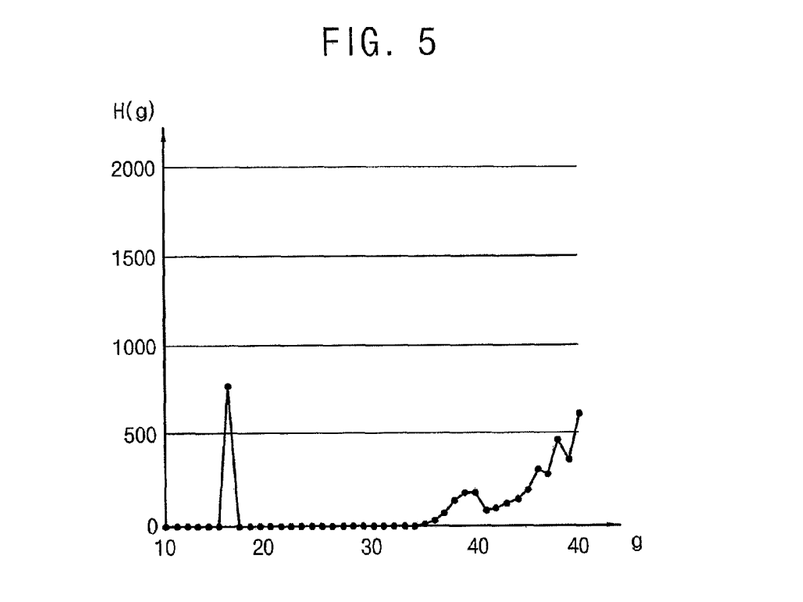
Figure 10:
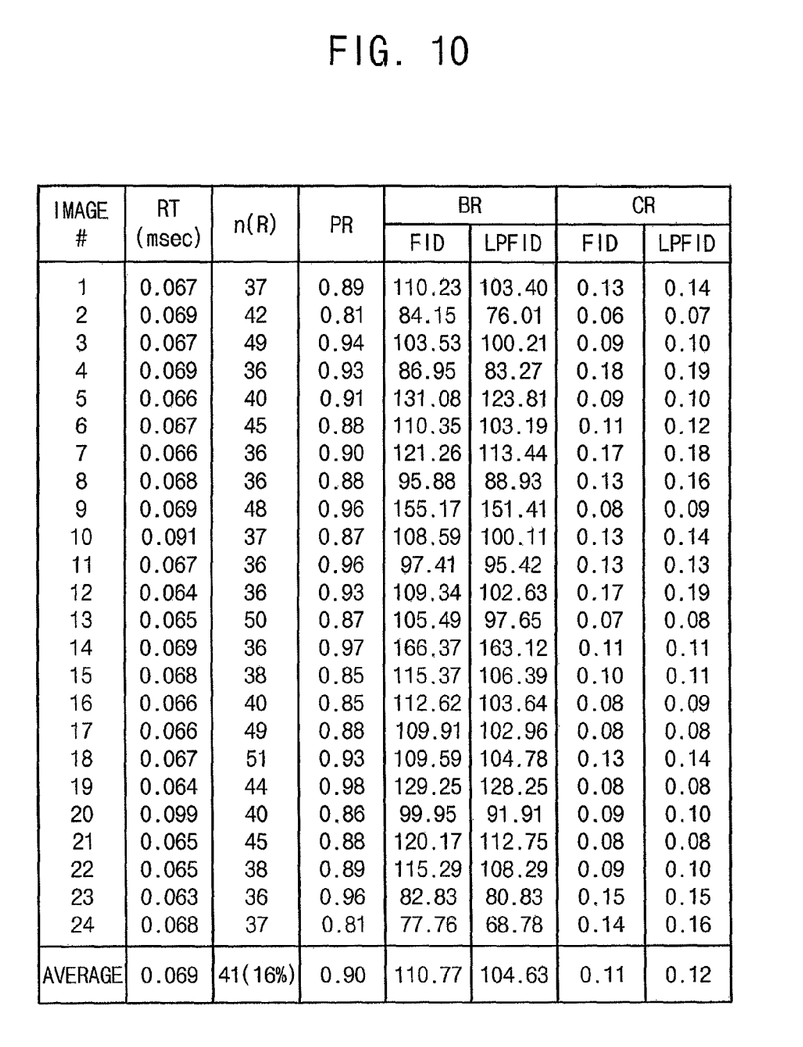
FIG. 10 illustrates a diagram for describing effects of image data processing according to example embodiments.

The histogram may be obtained by counting the numbers of the gray levels in the pixel data that are provided in the bit stream. The histogram corresponds to the pixel numbers H(g) respectively corresponding to the gray levels g between 0 and L−1 where L is the total number of the gray levels. FIG. 4 illustrates the histogram of the second image of the sample images in FIG. 10, and FIG. 5 illustrates the enlarged histogram of the gray levels between 10 and 50. Referring to FIG. 5, the pixel numbers H(g) become zero for the gray levels 10~16 and 18~34. The pixel numbers H(g) of 16% gray levels become zero, on average, for the 24 image samples in FIG. 10. The gray levels g satisfying H(g)=0 are not used to display the image. Thus, the histogram may be tuned or remapped so that the display power may be reduced.

In some example embodiments, the decrement function d( ) may be determined such that a value d(g) of the decrement function d( ) decreases as the pixel number H(g) corresponding to the gray level g decreases. For example, the decrement function d( ) may be determined using Equation 4.

$$d(g)=d(g-1)*[1-H(g)/N], \text{ if } g \in (U-Rs),$$

$$d(g)=d(g-1)+1, \text{ if } g \in Rs,$$

$$d(0)=0 \text{ and } d(1)=1 \qquad \text{Equation 4}$$

In Equation 4, H(g) is the pixel number corresponding to the gray level of g, N is a total number of the pixels in a frame, U is a universal set including all of the gray levels, R is a first set including the gray levels satisfying H(g)=0, and Rs is a second set that is a subset of the first set.

Using the decrement function of Equation 4, the change g−G(g) of the gray level g may be suppressed as the pixel number H(g) increases. Thus, the display power is reduced, but the contrast and brightness of the original image may be maintained properly.

The second set Rs may be determined by extracting the gray levels g in the first set R by a reference number sequentially from the smallest gray level in the first set R. For example, it is assumed that the total number L of the gray levels is 256, the first set R={0, 1, 2, 3, 4, 8, 9, 10, 12, 13, 14, 15, 211, 212, . . . , 255} and the reference number is 10. In this case, the second set Rs may be determined as Rs=[0, 1, 2, 3, 4, 8, 9, 10, 12, 13] and then U−Rs={5, 6, 7, 11, 14, 15, . . . , 255}.

In some example embodiments, the reference number may be determined as a maximum integer of M that satisfies Equation 5.

$$L-M \geq L*D, \qquad \text{Equation 5}$$

In Equation 5, L is the total number of the gray levels and D is a scaling parameter representing a degree of display power reduction. The scaling parameter D may be set to a value between 0 through 1. As the scaling parameter D approaches the zero, the number of the elements in the second set Rs increases, increasing display power reduction. However, if the scaling value D is set to an excessively small value, the remapped gray levels become compact. In this case, the image contrast may be reduced excessively and thus the quality of the displayed image may be degraded. Therefore the scaling parameter D has to be set to an appropriate value from 0 to 1.

Hereinafter, processes of detecting the localities respectively corresponding to the gray levels are described with reference to FIGS. 3, 6A, and 6B.

The locality represents a degree of nearness of pixels having the same gray level in a frame. In other words, the locality represents an extent that the pixels having the same gray level near each other in the frame, such that pixels having the same gray level form a cluster. When the image data are input by unit of rows, the calculation of the locality may be performed by unit of rows. For example, the locality may be calculated using three vectors; a temporary cluster size vector TCS for storing the pixel number in each cluster, a cluster size vector CL storing the pixel numbers in all of the clusters in the frame, and a last position vector LP storing the last position of the pixel having the corresponding gray level in each row.

The gray level of the currently-input pixel data of the present position is checked, and the value of the temporary cluster size vector TCS may be increased by one if the difference between the current position and the last position in the last position vector LP corresponding to the same gray level as the current position is equal to or smaller than a reference value. In contrast, if the difference between the current position and the last position in the last position vector LP corresponding to the same gray level as the current position is greater than the reference distance, the value of the temporary cluster size vector TCS is added to the cluster size vector CL, the value of the temporary cluster size vector TCS is initialized to zero, and the value of the last position vector LP is updated to the current position. FIG. 3 illustrates an example that the reference distance is set to a value of two. Referring to FIG. 3, with respect to the gray level of 72, the first cluster includes the pixels of the same gray level of 72 at the positions of 2, 3, and 5, and the second cluster includes the pixels of the same gray level of 72 at the positions of 9, 10, 11, 12, 14, and 15.

By performing such calculation for all the rows of the frame image data, the values corresponding to the respective gray levels of the cluster size vector CL may be obtained, and the values of the cluster size vector CL may be used as the above-mentioned localities CL(g).

As such, each of clusters corresponding to the gray level of g is detected when two or more pixels having the same gray level of g are located near each other in each row in the frame, and the locality of CL(g) corresponding to the gray level of g may be determined based on the total number of the pixels having the same gray level of g and included in all of the clusters. It may be determined that the two pixels are included in the same cluster when a distance of the two pixels having the same gray level in the same row is equal to or smaller than the reference distance.

Figure 6A:
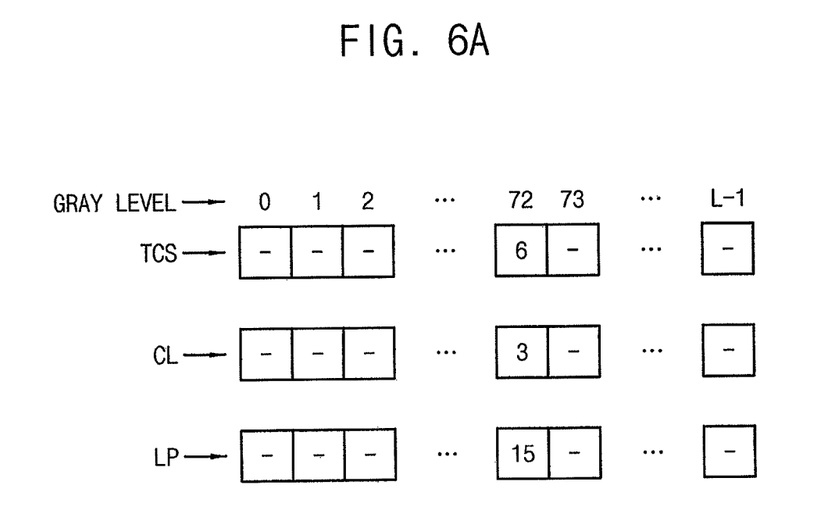
Figure 6B:
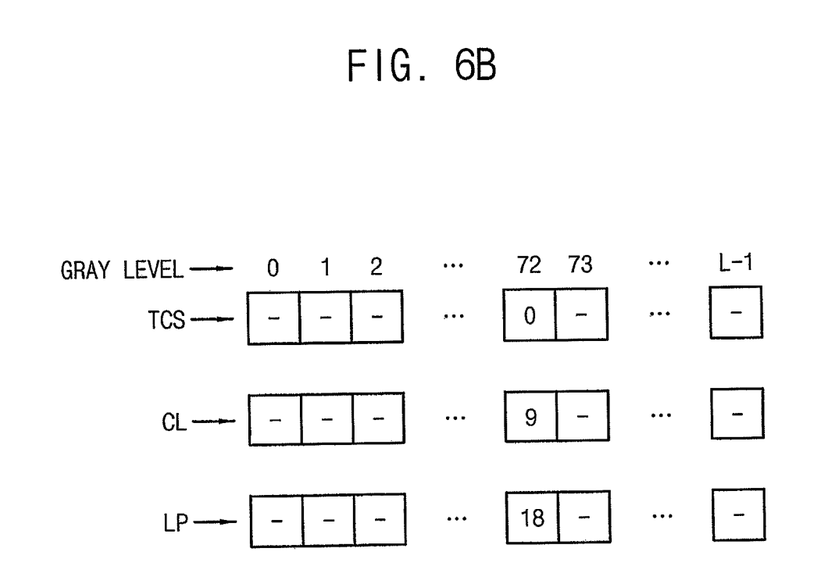

FIG. 6A illustrates the vector values before reflecting the current gray level and FIG. 6B illustrates the vector values after reflecting the current gray level. In an example of FIGS. 3, 6A, and 6B, the current position corresponds to 18 and the current gray level of the currently-input pixel data is 72, and the value the last position vector LP is 15 before reflecting the current gray level. If the above-mentioned reference distance is 2, the difference between the current position and the last position corresponding to the current gray level 72 is 3, which is greater than the reference distance 2. In this case, the value of 6 in the temporary cluster size vector TCS is added to the value of 3 in the cluster size vector CL and thus the value of the cluster size vector CL becomes 9 after reflecting the current gray level. The value of the temporary size vector TCS is initialized to zero and the value of the last position vector LP is updated to the current position of 18.

In some example embodiments, the decrement function d( ) may be determined such that a value d(g) of the decrement function d( ) decreases as the pixel number H(g) corresponding to the gray level g decreases and also the value of the decrement function d( ) decreases as the pixels having the same gray level g locate nearer to each other in the frame. For example, the decrement function d( ) may be determined using Equation 6.

$$d(g)=d(g-1)*[1-CL(g)/H(g)]*[1-H(g)/N], \text{ if } g \in (U-R),$$

$$d(g)=d(g-1), \text{ if } g \in (R-Rs),$$

$$d(g)=d(g-1)+1, \text{ if } g \in Rs,$$

$$d(0)=0 \text{ and } d(1)=1, \qquad \text{Equation 6}$$

In Equation 6, CL(g) is the locality representing the degree of nearness of the pixels having the same gray level of g in the frame, H(g) is the pixel number corresponding to the gray level of g, N is a total number of the pixels in the frame, U is a universal set including all of the gray levels, R is a first set including the gray levels satisfying H(g)=0, and Rs is a second set that is a subset of the first set.

Using the decrement function of Equation 6, the change g−G(g) of the gray level g may be decreased or suppressed as the pixel number H(g) increases and/or the locality CL(g) increases. Thus the display power is reduced, but the contrast and brightness of the original image may be maintained properly.

The second set Rs may be determined by extracting the gray levels g in the first set R by a reference number sequentially from the smallest gray level in the first set R. For example, it is assumed that the total number L of the gray levels is 256, the first set R={0, 1, 2, 3, 4, 8, 9, 10, 12, 13, 14, 15, 211, 212, . . . , 255} and the reference number is 10. In this case, the second set Rs may be determined as Rs=[0, 1, 2, 3, 4, 8, 9, 10, 12, 13], R−Rs={14, 15, 211, . . . , 255} and U−R={5, 6, 7, 11, 16, 17, . . . , 210}.

As described above, the reference number may be determined as a maximum integer of M that satisfies Equation 5.

Figure 7:
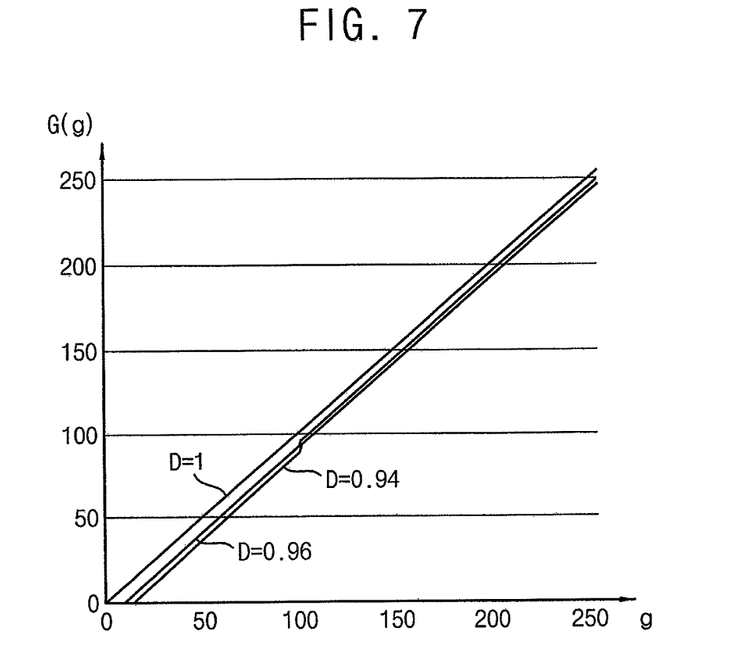
FIG. 7 illustrates a diagram of examples of a remapping function for a method of processing image data according to example embodiments.

FIG. 7 is a diagram illustrating examples of a remapping function for a method of processing image data according to example embodiments.

Referring to FIG. 7, the remapped gray levels G(g) may be reduced as the scaling parameter D representing a degree of display power reduction as described with reference to Equation 5. As the scaling parameter D approaches the zero, the number of the elements in the second set Rs increases and thus the effect of the display power reduction may increase. However, if the scaling value D is set to an excessively small value, the remapped gray levels become compact. In this case, the image contrast may be reduced excessively, degrading image quality. Therefore the scaling parameter D has to be set to an appropriate value from 0 to 1.

Figure 8:
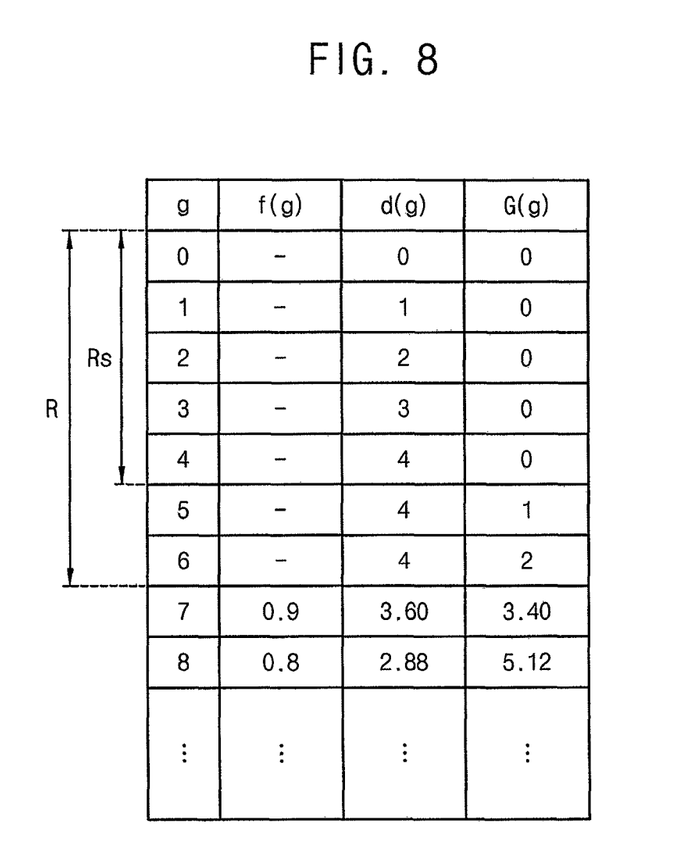
FIGS. 8 and 9 illustrate diagrams for describing processes of determining a remapping function for a method of processing image data according to example embodiments.
Figure 9:
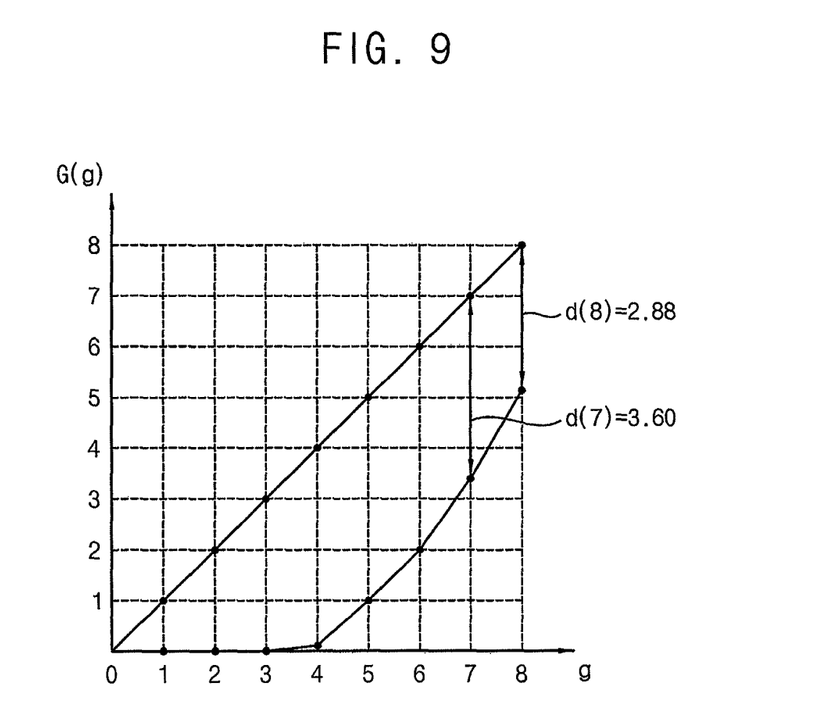

FIGS. 8 and 9 are diagrams for describing processes of determining a remapping function for a method of processing image data according to example embodiments.

In FIGS. 8 and 9, g is the gray level, d(g) is the value of the decrement function corresponding to the gray level g, and G(g) is the remapped gray level corresponding to the gray level g. d(g) may correspond to [1−H(g)/N] in case of Equation 4 and d(g) may correspond to [1−CL(g)/H(g)]*[1−H(g)/N] in case of Equation 6.

It is assumed that the first set R is {0, 1, 2, 3, 4, 5, 6} and the second set Rs is {0, 1, 2, 3, 4} which is the subset of the first set R. As illustrated in FIGS. 8 and 9, the changing trend of the value d(g) is determined according to the determination of the second set Rs. The value d(g) is increased according to the increase of the gray level g for the gray levels included in the second set Rs but the value d(g) is decreased or maintained for the gray levels out of the second set Rs.

The value d(g) is decreased as the pixel number H(g) is increased and/or the locality CL(g) is increased. In other words, the difference between the remapped gray level G(g) and the original gray level g is decreased as the pixel number H(g) is increased and/or the locality CL(g) is increased. Accordingly, the display power may be reduced, but the contrast and brightness of the original image may be maintained properly, by suppressing the change of the gray level as the pixel number H(g) is increased and/or the locality CL(g) is increased.

FIG. 10 is a diagram for describing effects of image data processing according to example embodiments.

FIG. 10 illustrates various measurement values for twenty-four Kodak® sample images that are widely used in the image processing experiments. Among the twenty-four sample images, 18 sample images have the resolution of 768*512 and 6 sample images have the resolution of 512*768. FIG. 10 indicates the original frame image data and LPFID indicates the low-power frame image data processed according to example embodiments.

RT is a running time of image data processing according to example embodiments at the clock frequency of about 3.3 GHz, n(R) is the number of the gray levels having the pixel number of zero, and PR is a display power ratio of the LPFID with respect to the FID. BR indicates the image brightness and the CR indicates the image contrast. The above-mentioned scaling parameter D is set to a value of 0.98.

Referring to FIG. 10, the running time RT according to example embodiments is about 0.069 msec on average, which is very small compared with a conventional running time. The image brightness BR is reduced by about 6% due to the display power reduction, but the image contrast CR is increased by about 9%.

As such, the method of processing image data and the display system according to example embodiments may achieve the display power reduction and the image contrast enhancement without decreasing the operation speed excessively because the image data are processed through the simple calculations without using complex algorithms.

Figure 11:
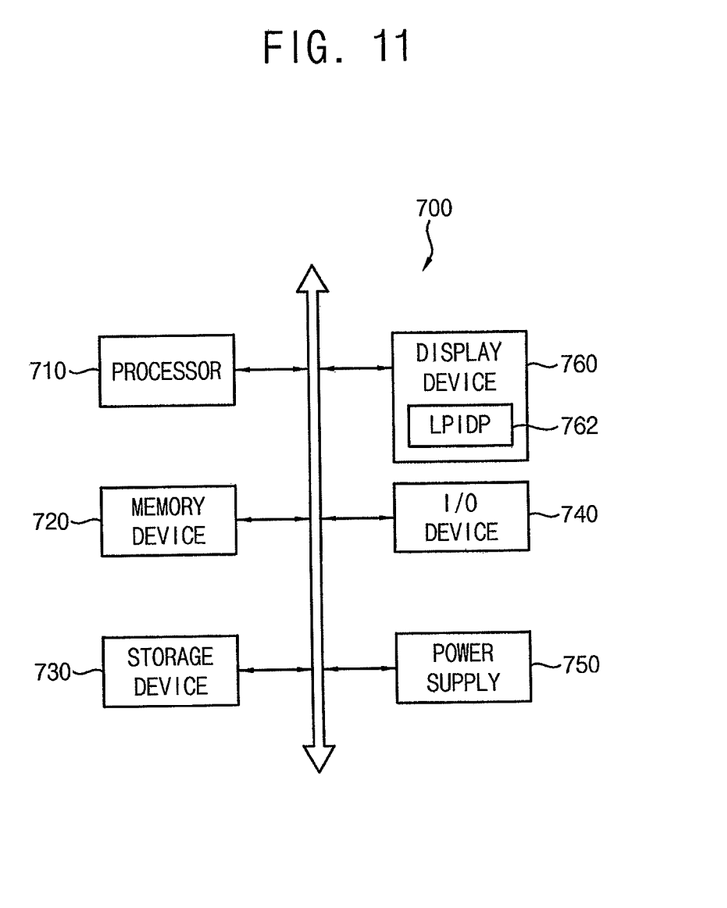
FIG. 11 illustrates a block diagram of a system according to example embodiments.

FIG. 11 is a block diagram illustrating a system according to example embodiments.

Referring to FIG. 11, a system 700 includes a processor 710, a memory device 720, a storage device 730, an input/output (I/O) device 740, a power supply 750, and a display device 760. The system 700 may further include a plurality of ports for communicating with a video card, a sound card, a memory card, a universal serial bus (USB) device, or other electronic systems.

The processor 710 may perform various computing functions or tasks. The processor 710 may be for example, a microprocessor, a central processing unit (CPU), etc. The processor 710 may be connected to other components via an address bus, a control bus, a data bus, etc. Further, the processor 710 may be coupled to an extended bus such as a peripheral component interconnection (PCI) bus.

The memory device 720 may store data for operations of the system 700. For example, the memory device 720 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano-floating gate memory (NFGM) device, a polymer random access memory (PoRAM) device, a magnetic random access memory (MRAM) device, a ferroelectric random access memory (FRAM) device, and/or at least one volatile memory device such as a dynamic random access memory (DRAM) device, a static random access memory (SRAM) device, a mobile dynamic random access memory (mobile DRAM) device, etc.

The storage device 730 may be, for example, a solid state drive (SSD) device, a hard disk drive (HDD) device, a CD-ROM device, etc. The I/O device 740 may be, for example, an input device such as a keyboard, a keypad, a mouse, a touch screen, and/or an output device such as a printer, a speaker, etc. The power supply 750 may supply power for operating the system 700. The display device 760 may communicate with other components via the buses or other communication links.

The display device 760 includes a low-power image data processor LPIDP 762 according to example embodiments. As described above, the low-power image data processor 762 may include a detector configured to detect a distribution of gray levels of frame image data, a remapper configured to determine a remapping function for providing remapped gray levels based on the distribution of the gray levels such that the remapped gray levels are lower than the gray levels, and a filter configured to provide low-power frame image data based on the frame image data and the remapping function such that the low-power frame image data have display power lower than the frame image data.

The present embodiments may be applied to any mobile device or any computing device. For example, the present embodiments may be applied to a cellular phone, a smart phone, a tablet computer, a personal digital assistant (PDA), a portable multimedia player (PMP), a digital camera, a music player, a portable game console, a navigation system, a video phone, a personal computer (PC), a server computer, a workstation, a tablet computer, a laptop computer, etc.

The image data processor may be implemented in logic which, for example, may include hardware, software, or both. When implemented at least partially in hardware, the image data processor may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the image data processor may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The method of processing image data and the display system according to example embodiments may achieve the display power reduction and the image contrast enhancement without decreasing the operation speed excessively because the image data are processed through the simple calculations rather than complex algorithms. In addition, the method of processing image data and the display system according to example embodiments may enhance image contrast while reducing the display power by adjusting brightness of the displayed image in accordance with the locality of the gray levels having the same gray level to suppress the change of the gray level having the higher locality, i.e., when the gray level has higher probability of forming an object in the displayed image.

The method of processing image data and the display system according to example embodiments may reduce display power in the electroluminescent display device by adjusting brightness of the displayed image with considering the distribution of the gray levels.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of processing image data, the method comprising:
    detecting a distribution of gray levels of frame image data by a detector;
    determining a remapping function for providing remapped gray levels based on the distribution of the gray levels by a remapper, a number of the remapped gray levels being less than a number of the gray levels; and
    providing low-power frame image data based on the frame image data and the remapping function by a filter, wherein displaying the low-power frame image data uses power lower than displaying the frame image data.

2. The method as claimed in claim 1, wherein the distribution of the gray levels include pixel numbers respectively corresponding to the gray levels and localities respectively representing degrees of nearness of pixels having the same gray levels in a frame.

3. The method as claimed in claim 1, wherein the remapping function is determined as follows, $$G(g)=g-d(g),$$

where g is each gray level, G( ) is the remapping function, G(g) is the remapped gray level corresponding to the gray level of g, d( ) is a decrement function that depends on the distribution of the gray levels, and d(g) is a value corresponding to the gray level of g, the value d(g) being determined based on the decrement function d( ) and being equal to or greater than zero.

4. The method as claimed in claim 3, wherein a value of the decrement function decreases as the pixel number corresponding to the gray level increases.

5. The method as claimed in claim 3, wherein a value of the decrement function decreases as the pixels having the same gray level located near each other in a frame increases.

6. The method as claimed in claim 3, wherein detecting the distribution of the gray levels includes detecting pixel numbers respectively corresponding to the gray levels.

7. The method as claimed in claim 6, wherein the decrement function is determined as follows, $$d(g)=d(g-1)*[1-H(g)/N], \text{ if } g\epsilon(U-Rs),$$

$$d(g)=d(g-1)+1, \text{ if } g\epsilon Rs,$$

$$d(0)=0 \text{ and } d(1)=1,$$

where H(g) is the pixel number corresponding to the gray level of g, N is a total number of the pixels in a frame, U is a universal set including all of the gray levels, R is a first set including the gray levels satisfying H(g)=0, and Rs is a second set that is a subset of the first set, wherein N is a natural number.

8. The method as claimed in claim 7, wherein determining the second set includes extracting the gray levels in the first set by a reference number sequentially from the smallest gray level in the first set.

9. The method as claimed in claim 8, wherein the reference number is determined as a maximum integer of M that satisfies following equation, $$L-M \geq L*D,$$

where L is a total number of the gray levels and D is a scaling parameter representing a degree of display power reduction, wherein L and M are natural numbers, and D is a rational number greater than zero.

10. The method as claimed in claim 3, wherein detecting the distribution of the gray levels includes:
    detecting pixel numbers respectively corresponding to the gray levels; and
    detecting localities respectively representing degrees of nearness of pixels having the same gray levels in a frame.

11. The method as claimed in claim 10, wherein the decrement function is determined as follows, $$d(g)=d(g-1)*[1-CL(g)/H(g)]*[1-H(g)/N], \text{ if } g\epsilon(U-R),$$

$$d(g)=d(g-1), \text{ if } g\epsilon(R-Rs),$$

$$d(g)=d(g-1)+1, \text{ if } g\epsilon Rs,$$

$$d(0)=0 \text{ and } d(1)=1,$$

where CL(g) is the locality representing the degree of nearness of the pixels having the same gray level of g in the frame, H(g) is the pixel number corresponding to the gray level of g, N is a total number of the pixels in the frame, U is a universal set including all of the gray levels, R is a first set including the gray levels satisfying H(g)=0, and Rs is a second set that is a subset of the first set, wherein N is a natural number.

12. The method as claimed in claim 11, wherein each of clusters corresponding to the gray level of g is detected when two or more pixels having the same gray level of g are located near to each other in each row in the frame, and the locality of CL(g) corresponding to the gray level of g is determined based on a total number of the pixels having the same gray level of g and included in all of the clusters.

13. The method as claimed in claim 12, wherein two pixels are included in the same cluster when a distance of the two pixels having the same gray level in the same row is equal to or smaller than a reference distance.

14. The method as claimed in claim 11, wherein determining the second set includes extracting the gray levels in the first set by a reference number sequentially from the smallest gray level in the first set.

15. The method as claimed in claim 11, wherein the reference number is determined as a maximum integer of M that satisfies following equation, $$L-M \geq L*D,$$

where L is a total number of the gray levels and D is a scaling parameter representing a degree of display power reduction, wherein L and M are natural numbers, and D is a rational number greater than zero.

16. A display system, comprising:
a detector to detect a distribution of gray levels of frame image data;
a remapper to determine a remapping function for providing remapped gray levels based on the distribution of the gray levels, a number of the remapped gray levels being less than a number of the gray levels;
a filter to provide low-power frame image data based on the frame image data and the remapping function, wherein displaying the low-power frame image data uses power lower than displaying the frame image data; and
a display device to display an image based on the low-power frame image data.

17. The display system as claimed in claim 16, wherein the detector includes:
a histogram detector to provide pixel numbers respectively corresponding to the gray levels; and
a locality detector to provide localities respectively representing degrees of nearness of pixels having the same gray levels in a frame.

18. The display system as claimed in claim 17, wherein the remapper determines the remapping function as follows, $$G(g)=g-d(g),$$

where g is each gray level, G( ) is the remapping function, G(g) is the remapped gray level corresponding to the gray level of g, d( ) is a decrement function that depends on the distribution of the gray levels, and d(g) is a value corresponding to the gray level of g, the value d(g) being determined based on the decrement function d( ) and being equal to or greater than zero.

19. The display system as claimed in claim 18, wherein the remapper determines the decrement function as follows, $$d(g)=d(g-1)*[1-CL(g)/H(g)]*[1-H(g)/N], \text{ if } g\epsilon(U-R),$$

$$d(g)=d(g-1), \text{ if } g\epsilon(R-Rs),$$

$$d(g)=d(g-1)+1, \text{ if } g\epsilon Rs,$$

$$d(0)=0 \text{ and } d(1)=1,$$

where CL(g) is the locality representing the degree of nearness of the pixels having the same gray level of g in the frame, H(g) is the pixel number corresponding to the gray level of g, N is a total number of the pixels in the frame, U is a universal set including all of the gray levels, R is a first set including the gray levels satisfying H(g)=0, and Rs is a second set that is a subset of the first set, wherein N is a natural number.

20. The display system as claimed in claim 16, wherein the display device is an electroluminescent device.

* * * * *